Patented Dec. 9, 1941

2,265,204

UNITED STATES PATENT OFFICE 2,265,204

INSECTICIDAL COMPOSITIONS

Frank B. Smith and Harold W. Moll, Midland, Mich., assignors to The Dow Chemical Company, Midland, Mich., a corporation of Michigan No Drawing. Application December 5, 1939, Serial No. 307,654

9 Claims. (Cl. 167—33)

This invention relates to insecticides and is particularly concerned with compositions comprising cycloalkyl substituted phenothioxins as active toxicants.

The metal arsenates, such as those of lead, magnesium, and calcium, have long been employed as stomach poisons for inclusion in agricultural spray materials. Arsenical residues deposited in and on fruits and vegetables have proven hazardous to humans to such an extent that the use of the arsenates has been appreciably curtailed. Legislation regulating arsenical residues has necessitated treatments for residue removal which greatly increase the ultimate cost of pest control. A further disadvantage in the use of many of the arsenates is that in combination with lime sulfur, they react to form compounds which cause severe foliage injury. Acid lead arsenate also reacts with oil emulsions to such an extent that they are rendered unstable and injurious to growing vegetation. In view of the foregoing, the development of new stomach poisons for insect pests is of increasing importance.

We have discovered that cycloalkyl substituted phenothioxins are effective stomach and contact poisons and may be substituted for acid lead arsenate and other common inorganic and organic toxicants in compositions for the control of insects generally. The new toxicants have the formula

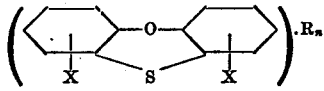

wherein X represents phenyl, lower alkyl, halogen, or hydrogen, R represents a cycloalkyl radical, and $n$ is an integer not greater than 2. These compounds are for the most part viscous oils which sometimes show a tendency to solidify on standing. They are insoluble in water, soluble in most common organic solvents, stable on exposure to light and air, and substantially non-toxic to the higher forms of animal life. When employed in insecticidal compositions they are at least as effective as the arsenates, superior in toxicity to phenothioxin, and compatible with such insecticidal materials as oil sprays and lime sulfur.

The cycloalkyl substituted phenothioxins may be prepared by reacting phenothioxin or halogen, alkyl, or phenyl substituted phenothioxin with a cycloalkylating agent, e. g. cyclohexene, cyclopentanol, 2-methyl-5-isopropyl-cyclohexyl chloride, etc., under such conditions of temperature and pressure and in the presence of such catalysts as favorably influence the introduction of one or more cycloalkyl radicals into one or both of the phenyl nuclei of the phenothioxin molecule. Where cycloalkenes or hydroxy-cycloalkanes are employed, the reaction may be conveniently carried out in the presence of acid activated bleaching earth, such as Retrol. Bleaching earths of this type are also identified as surface-active siliceous clay catalysts. Where cycloalkyl or substituted cycloalkyl halides are employed, aluminum bromide or aluminum chloride are suitable as catalysts.

In carrying out the reaction in the presence of bleaching earth catalyst, any suitable amounts of phenothioxin and cycloalkylating agent may be heated together to obtain the desired compounds, a mixture of the mono- and polycycloalkylated products being obtained along with some unreacted phenothioxin regardless of the proportions employed. We generally use from about 0.3 to 3 molar equivalents of the cycloalkylating agent per mole of phenothioxin compound. The temperature required to cause reaction is between about 125° and 300° C., although somewhat lower temperatures may sometimes be employed. After heating the reactants together at the required temperature, the mixture is cooled, filtered to remove catalyst, washed with water, and fractionally distilled under reduced pressure to separate out the desired compound. The preparation and properties of a number of compounds falling within the scope of this invention are described in our application Serial No. 272,817 filed May 10, 1939 now Patent No. 2,221,820. The preparation of the lower alkyl- and phenyl-substituted phenothioxins employed as reactants, is described in application Serial No. 272,816 filed May 10, 1939 now Patent No. 2,221,819.

The cycloalkylated phenothioxins are particularly valuable as constituents of insecticidal compositions which are to be contacted with growing vegetation. Their low water solubility, oily characteristics, stability, and low vapor pressure result in an extended residual toxicity against insect pests and minimum foliage injury for compositions in which they are employed.

Our new toxicants may be compounded with various inert carriers, such as diatomaceous earth, bentonite, sulfur, wood flours, inorganic phosphates, or lime, to form agricultural dusts adapted to be applied in standard dusting equipment. If desired, such dusts may be employed as concentrates and subsequently diluted with water or other liquid carriers to form sprays. The compounds may also be incorporated with various wetting, dispersing, and sticking agents to form compositions which may be diluted to produce dust or spray materials in which the cycloalkyl substituted phenothioxins are present in any desired concentration. In the preparation of concentrates from about 5 to 95 per cent by weight of the cycloalkyl-phenothioxin derivative is commonly employed in the composition. The concentration of the toxicant in dilute spray or dust compositions is preferably between about 0.2 per cent and 5 per cent by weight. The type of composition in which the phenothioxin compound is employed and the concentration thereof are dependent upon the type of insect to be controlled and the circumstances under which such control is to be accomplished.

In other embodiments of the invention, the cycloalkylated phenothioxin derivative may be dissolved in the oil phase of an oil-water emulsion. Such compounds may also be employed in water suspension with or without emulsifying, wetting, or dispersing agents. Likewise, these derivatives may be incorporated in other common insecticidal compositions either as the sole toxic ingredient thereof or in combination with such materials as inorganic pigments, organic dyes, acid lead arsenate, lime sulfur, pyrethrum, rotenone, organic thiocyanates, sulfur, copper sprays, and the like.

The several examples are illustrative with respect to the particular compounds, composition types, and concentrations employed but are not to be construed as limiting the invention.

Example 1

20 parts by weight of monocyclohexyl-phenothioxin (boiling point 232° to 238° C. at 20 mm. pressure) was dissolved in acetone and the resulting solution used to wet 80 parts by weight of diatomaceous earth. This mixture was air-dried to evaporate off the acetone and thereafter ground in a ball mill. The ground material was employed as a concentrate in the preparation of spray compositions, which were applied for the control of various chewing insects.

15 pounds of the foregoing composition containing 3 pounds of toxicant was dispersed in sufficient water to produce 100 gallons of spray. The resulting dispersion was applied for the control of oak leaf roller larvae and found to kill 100 per cent in 4 days. Acid lead arsenate at a concentration of 3 pounds per 100 gallons of spray was effective against 40 per cent of the same insects in an analogous test.

The aqueous dispersion as described above was also applied to potato vines infested with Colorado potato beetle larvae (medium instar). This treatment was effective against 81 per cent of the beetle larvae in 3 days. At concentration of 3 pounds per 100 gallons of spray composition, acid lead arsenate was effective against 87 per cent of the beetle larvae.

No appreciable injury to growing foliage was observed for the compositions comprising the cyclohexyl-phenothioxin in either of the above determinations.

Example 2

In a similar manner, an insecticidal concentrate was prepared consisting of 20 parts by weight of a mixture of dicyclohexyl-phenothioxins (boiling at 300°–360° C. at 3.5 mm. pressure) and 80 parts by weight of diatomaceous earth. When dispersed in an amount of water sufficient to give a concentration of 5 pounds of the dicyclohexyl-phenothioxin per 100 gallons, a composition was obtained which was 100 per cent effective against oak leaf roller larvae in 4 days. At 3 pounds per 100 gallons, acid lead arsenate was effective against 40 per cent of the oak leaf roller larvae.

Example 3

47.6 parts by weight of the dicyclohexyl-phenothioxin, described in Example 2, 47.6 parts by weight of white mineral oil, and 4.8 parts by weight of an oil-soluble naphthenate were mixed together to form a water-miscible oil spray composition. This solution was diluted with sufficient water to give a concentration of 3 pounds of the dicyclohexyl-phenothioxin in 100 gallons of spray. When applied to poplar trees, this dilute composition was 100 per cent effective against poplar aphis in 1 day. No burning or other injury to foliage resulted from the application.

Example 4

20 parts by weight of monocyclohexyl-3-chloro-phenothioxin (boiling at 215°–231° C. at 4 mm. pressure) and 80 parts by weight of diatomaceous earth were mixed together substantially as described in Example 1. 15 pounds of this composition was dispersed in sufficient water to form 100 gallons of spray material. This spray was applied for the control of southern army worm (5th and 6th instar) and found to be 100 per cent effective within 3 days of application. Acid lead arsenate when similarly applied at a concentration of 3 pounds per 100 gallons of spray was effective against 60 per cent of the southern army worm larvae.

While the foregoing examples are concerned with the cyclohexyl substituted phenothioxins, related compounds as derived by the reaction of such cycloalkylating agents as cyclobutylene, cyclopentene, 2-methyl-5-isopropyl-cyclohexene, 2-methyl cyclohexene, 4-chloro-cyclohexene, cyclohexyl-cyclohexonal, phenyl-cyclohexanol, and the like with phenothioxin, phenyl-phenothioxin, monochloro-phenothioxin, monobromo-phenothioxin, monopropyl-phenothioxin, diethyl-phenothioxin, tertiaryoctyl-phenothioxin, 2.7-dimethyl-phenothioxin, 2.7-dichloro-phenothioxin, 3.6-dibromo-phenothioxin, 1-methyl-phenothioxin, 6-chloro-3-methyl-phenothioxin, and the like, may be similarly employed.

Other modes of applying the principle of our invention may be employed instead of those explained, change being made as regards the materials or their amounts employed, provided the ingredients stated by any of the following claims or their equivalent be employed.

We therefore particularly point out and distinctly claim as our invention.

1. An insecticidal composition comprising as an active toxicant a compound having the formula $$\left(\underset{X}{\underset{|}{\bigcirc}}\underset{S}{\overset{-O-}{\diagup\diagdown}}\underset{X}{\underset{|}{\bigcirc}}\right)\cdot R_n$$

wherein X represents a member of the group consisting of phenyl, lower alkyl, halogen, and hydrogen, R represents a cycloalkyl radical, and $n$ is an integer not greater than 2.

2. An insecticidal composition comprising an intimate mixture of diatomaceous earth with a compound having the formula

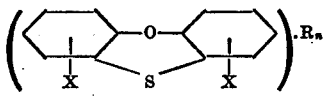

wherein X represents a member of the group consisting of phenyl, lower alkyl, halogen, and hydrogen, R represents a cycloalkyl radical, and $n$ is an integer not greater than 2.

3. An insecticidal spray composition comprising as an active toxicant a compound having the formula

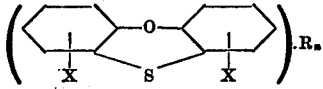

wherein X represents a member of the group consisting of phenyl, lower alkyl, halogen, and hydrogen, R represents a cycloalkyl radical, and $n$ is an integer not greater than 2.

4. An insecticidal composition comprising as an active toxicant a compound having the formula

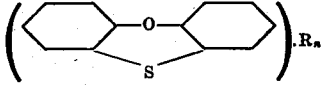

wherein R represents a cycloalkyl radical and $n$ is an integer not greater than 2.

5. An insecticidal composition comprising as an active toxicant a compound having the formula

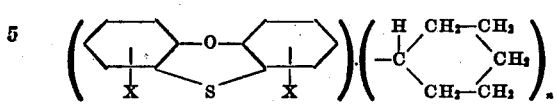

wherein X represents a member of the group consisting of phenyl, lower alkyl, halogen, and hydrogen, and $n$ is an integer not greater than 2.

6. An insecticidal composition comprising as an active toxicant a compound having the formula

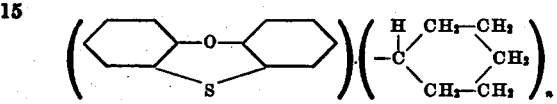

wherein $n$ is an integer not greater than 2.

7. An insecticidal composition comprising as an active toxicant monocyclohexyl-phenothioxin.

8. An insecticidal composition comprising as an active toxicant dicyclohexyl-phenothioxin.

9. An insecticidal composition comprising as an active toxicant monocyclohexyl-3-chlorophenothioxin.

FRANK B. SMITH.
HAROLD W. MOLL.